United States Patent [19]
Romo

[11] Patent Number: 5,558,764
[45] Date of Patent: Sep. 24, 1996

[54] RAG CATCHER

[76] Inventor: Ignacio Romo, 309-254 West 3rd Street, North Vancouver, BC V7M 1G2, Canada

[21] Appl. No.: 489,572

[22] Filed: Jun. 12, 1995

[51] Int. Cl.⁶ .................................................. B01D 21/26
[52] U.S. Cl. ......................... 210/220; 210/523; 210/532.1
[58] Field of Search ................................ 210/220, 523, 210/532.1, 512.1

[56] References Cited

U.S. PATENT DOCUMENTS

| | | | |
|---|---|---|---|
| 1,037,809 | 9/1912 | Van Eyck | 210/532.1 |
| 2,338,971 | 1/1944 | Ross | 210/532.1 |
| 3,048,277 | 8/1962 | Bland | 210/532.1 |
| 3,599,795 | 8/1971 | Worlidge | 210/526 |
| 3,710,941 | 1/1973 | Brociner | 210/220 |
| 3,984,322 | 10/1976 | Peasley et al. | 210/220 |
| 4,017,402 | 4/1977 | Fitch | 210/528 |
| 4,099,610 | 7/1978 | Aubailly-Delalieu | 198/729 |
| 4,138,343 | 2/1979 | Bologna | 210/526 |
| 4,229,301 | 10/1980 | Roberts | 210/159 |
| 4,681,683 | 7/1987 | Lindstol | 210/521 |
| 4,804,439 | 2/1989 | Fredriksson | 210/359 |

*Primary Examiner*—Christopher Upton
*Attorney, Agent, or Firm*—Fetherstonhaugh & Co.

[57] ABSTRACT

A tank for the treatment of sewage. The tank has walls and a base and includes a screw conveyor and an aerator pipe to allow circulation of the sewage by the passage of air. The tank has projections extending inwardly from at least one of the walls or the base of the tank to trap rags present in the sewage.

10 Claims, 3 Drawing Sheets

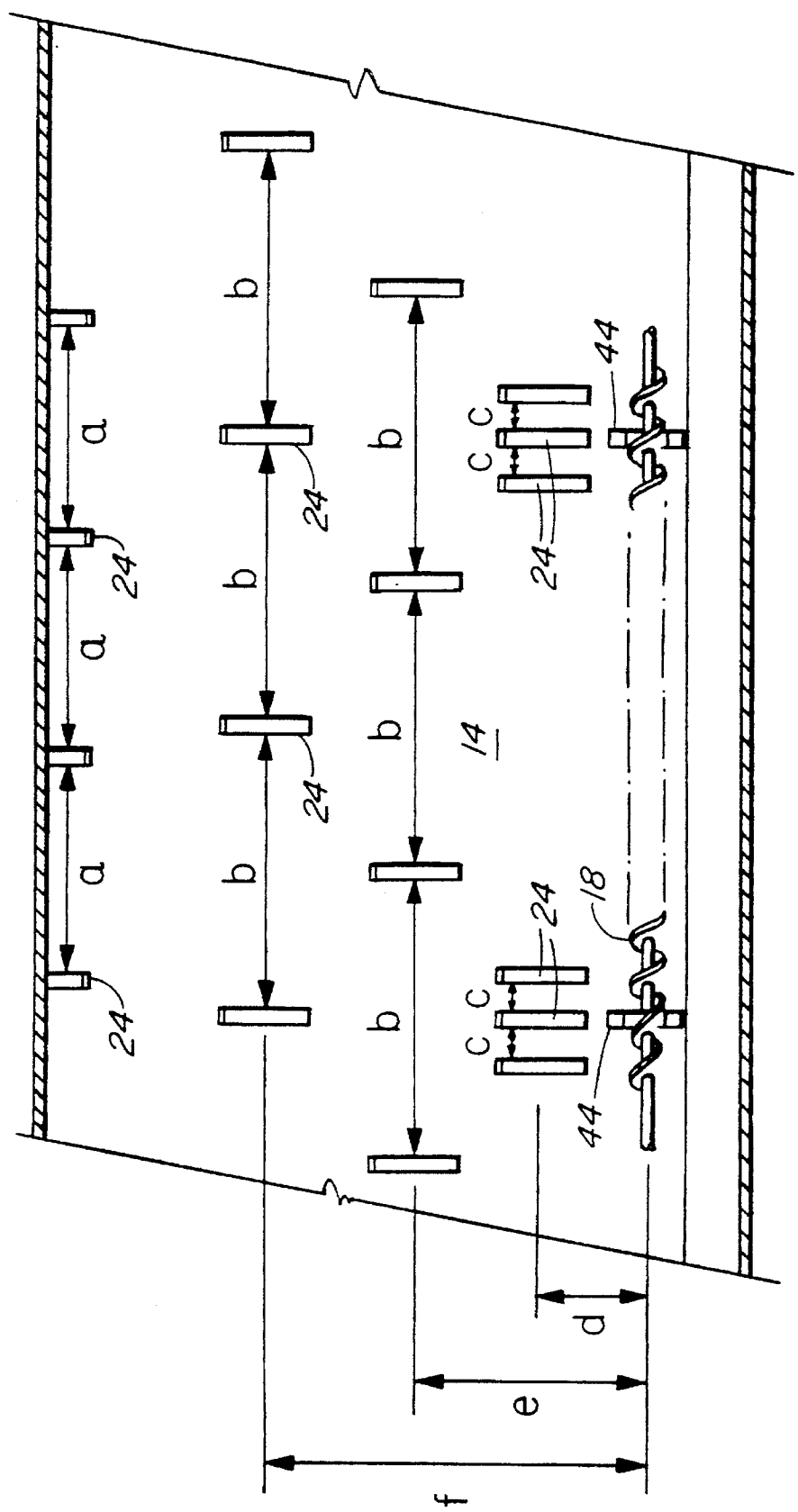

RAG CATCHER

FIELD OF THE INVENTION

This invention relates to a rag catcher for use in a tank in a waste water sewage treatment plant.

DESCRIPTION OF THE PRIOR ART

The treatment of sewage is of vital importance in any inhabited area. Sewage must be treated at considerable expense in such a way that the effluent from the sewage plant is harmless to the environment.

A typical treatment process proceeds as follows:

Pretreatment

The raw sewage is first passed over screens to take out large solid articles. Comminutors or barminutors may also be used to shred solid waste to particles about a quarter inch in size. A comminutor may, for example, be a slotted cylinder within which smaller cylinders with sharp edged slots rotate rapidly. A barminutor has a series of bars that move relative to each other to chop solids. After screening the raw sewage can be chlorinated to control odours, if required, then the sewage is fed to a grit chamber where small particles are removed. Grit chambers are also referred to as pre-aeration (P.A.) tanks.

Primary Treatment

Excess grease or oil is skimmed from the surface of the sewage in tanks. The sewage is then fed to a primary treatment sedimentation tank where suspended organic material can be reduced in content, typically by about 50% to about 60%. There are a large numbers of sedimentation tanks used throughout the world. They include grit chambers, plain sedimentation tanks, chemical sedimentation basins, septic tanks, Imhoff tanks and many other devices.

An important part of the process is aeration which is done in the grit tanks or P.A. tanks. Air is introduced for three reasons, first to replenish the oxygen taken up by the natural biochemical reaction taking place in the sewage. Secondly, to help in maintaining the organic solids in suspension. Thirdly to introduce a rolling action to the sewage as it flows forward causing grit to settle and be swept towards a screw conveyor located along the outside of the floor of the tank.

Each screw conveyor periodically moves the grit to an underwater sump at the influent end of the P.A. tank. A sequential timer, which controls this process tank by tank, also opens and closes a grit withdrawal valve for each tank. The grit from the tank is pumped to a cyclone dewaterer where it is concentrated from about 1½% solids to 65% solids. The grit is transported to a burial site.

Aeration chambers are commonly 10 to 15 feet deep, about 20 feet wide and about 30 to 46 feet long depending on whether there is demand for a small or large tank. Air is introduced by air diffusion or by mechanical agitation. In air diffusion air is introduced under pressure at about 5 to 10 pounds per square inch through diffusers in an amount of about 0.5 to 1.0 cubic feet of air per gallon of water.

From the aeration chambers the organic portion of the sewage, called sludge, passes to a sedimentation tank where it is settled out. Flow in the sedimentation tank is reduced to about 0.03 feet per second and retention time in the tank is about 2 to 4 hours, depending on the size of the tank and the velocity of the flow. The slow forward motion of the water allows organic solids to settle to the tank bottom. Wooden or plastic flights attached to continuous chains draw this sludge along the floor to the head end of the tank where it is deposited in a transverse channel. A similar chain and flight mechanism then draws the sludge to an underwater sump. At this point the sludge is pumped to a thickener in a slurry containing approximately 0.5% solids. Gradually the suspended solids settle to the base of the tank where a slow moving rake arm sweeps the solids into a sump from where they are pumped into the digesters.

Chlorination, carried out in contact tanks, may be used on the effluent from the final sedimentation tank and, after chlorination, a final treatment with sulfur dioxide may be carried out to remove excess chlorine. The liquid content is usually appropriate for disposal to the environment. In the sludge thickener, sludge is subjected to prolonged stirring which permits the escape of moisture and hence an increase in the solids content of the sludge. As a result, the sludge is less bulky.

Sludge from the thickener may be digested with mesophilic or thermophilic bacteria under anaerobic conditions and at relatively high temperatures. Mesophilic bacteria is effective at temperatures of about 37° to 39° C. and thermophilic bacteria at about 54° to 56° C. During digestion volatile organic acids are formed as an intermediate step in the break down of material. This results in the production of methane gas. The methane gas may be used in the treatment plant as fuel for boilers and engines.

Finally the digested sludge is centrifuged and may be discharged to the environment as it is then harmless. Solids may be applied to land as a humus. Part of the centrate may be recycled into the sewage treatment process.

Rags

A particular problem is provided by rags. For example stockings and pantyhose are made of material that, although of fine mesh, is robust. Such material is cut up by the comminutors and barminutors but the cut material continues in the process and tends to accumulate again, creating a hazard in the subsequent process. There are problems with the shafts of drain valves, with support brackets, with the bearings for shafts, for example the bearings for screw conveyors, screw conveyor drives and on baffles, all of which can accumulate rags and, as a result, malfunction. Rags block the diffusers and the suction grit lines. In the grit system, the rags will get stuck in the grit lines, especially in the valves, in the check valves and in the cyclone grit separators at the grit outlet.

The rags are also a hazard in the digesters where they build up and tend to knot, forming very large balls that are capable of plugging digester circulation lines, valves and the suction outlet at the bottom centre of the digesters. The biggest problem is when lines or valves cannot be dismantled to remove the rags. Removal in those circumstances can take days of work including back-flushing the system, Even then sometimes rags remain in the digesters creating the same problem over again. The rags also build up around the shafts of the mixers in the digesters. Build-up on the shafts creates an unbalanced rotation of the shafts, damaging the seals and the bearings. Build-up on the propellers reduces the mixing efficiency of the propellers.

The present invention seeks to solve this problem.

SUMMARY OF THE INVENTION

Accordingly, the present invention is in a tank for the treatment of sewage, the tank having walls and a base and including a screw conveyor and an aerator pipe to allow circulation of the sewage by the passage of air, the improvement comprising projections extending inwardly from at least one of said walls or said base of said tank to trap rags present in the sewage.

In a preferred embodiment, the projections are mounted in a plurality of rows with the projections in one row staggered relative to the projections in a neighbouring row. Projections may be on the wall and on the base. In a preferred embodiment that has proved useful two main rows are mounted on the base of the tank and one row on a wall of the tank.

It is also desirable to place a plurality of relatively closely spaced projections in front of, for example, bearings to ensure their protection.

It is preferred that the projections be inclined in relation to the base or the wall. Each projection inclines so that the outer end of the projection is upstream of the inner end of the projection relative to liquid flow in the tank. The included angle may be in the range of about 40° to 60°, preferably about 45° to 50°.

Desirably serrations are formed on the upstream face of the projections to facilitate the catching of rags.

DESCRIPTION OF THE DRAWINGS

The invention is illustrated in the drawings in which:

FIG. 5 is a plan view showing a typical arrangement of projections in a tank.

DESCRIPTION OF THE PREFERRED EMBODIMENTS

Figure 1:
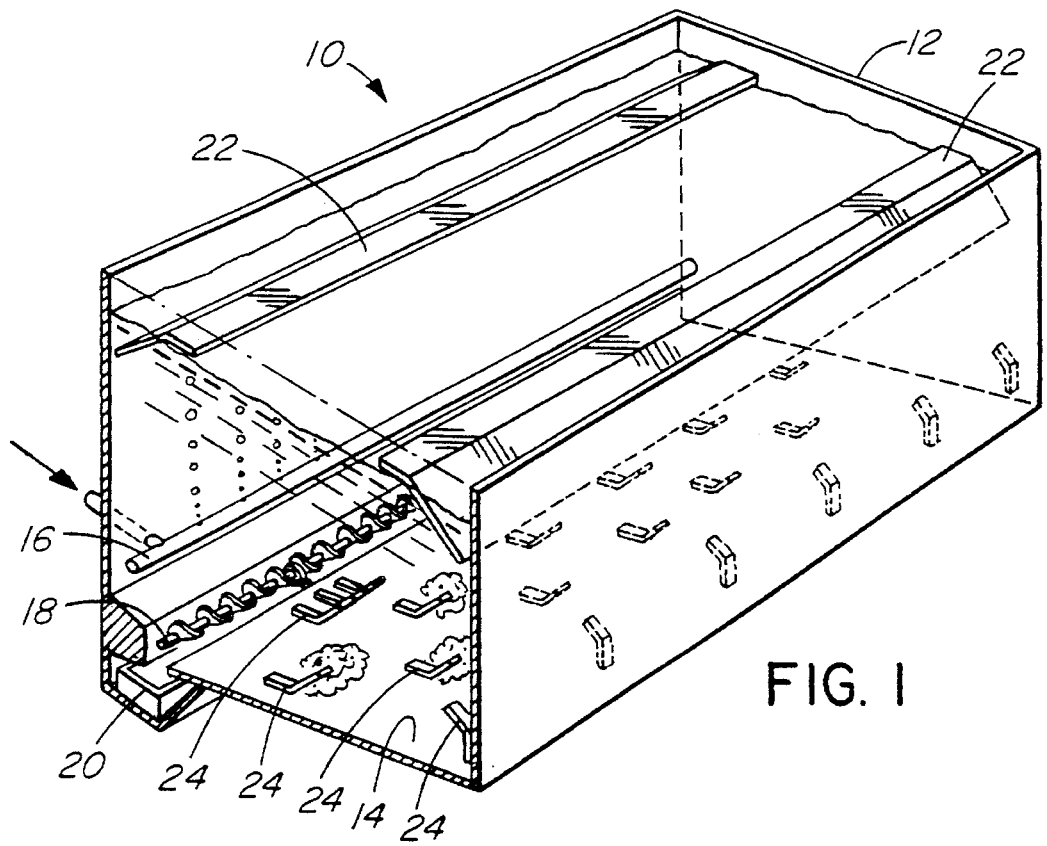
FIG. 1 is an isometric view of a tank including projections according to the present invention.
Figure 2:
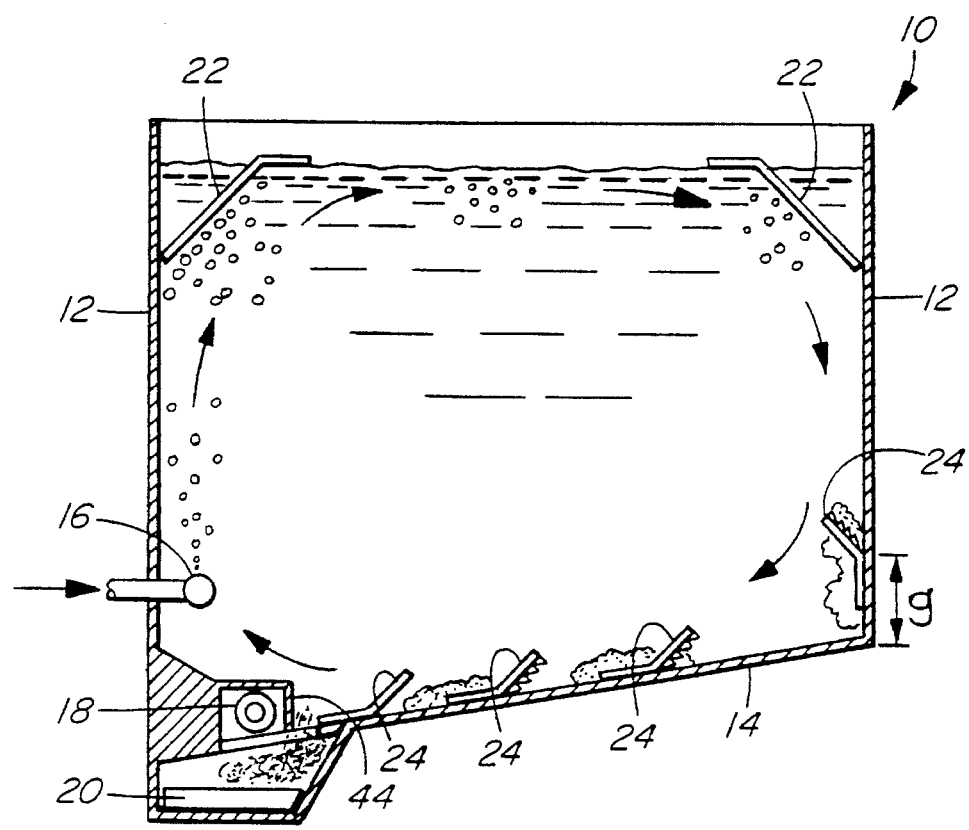
FIG. 2 is a side elevation of the tank of FIG. 1.

FIGS. 1 and 2 show a tank 10 for the treatment of sewage. The tank is a large structure having walls 12 and a base 14. There is a diffuser 16 through which air at about 5 to 10 pound per square inch is forced. The air acts to aerate the sewage and also to direct it around the tank, shown by the arrows in FIG. 2. There is an auger 18, mounted in bearings and extending along one side of the tank 10. The bearings are in brackets 44 mounted on the wall 12. In general base 14 of the tank 10 slopes towards the auger 18, as shown in FIG. 2. Air flow is chosen to direct the sewage down the slope of the base 14. The auger 18 directs material directed to it by the flow of water (induced by the air flow) to a grit sump 20 and then to a collector mechanism.

Baffles 22 are used to control the direction of flow.

According to the invention, projections 24 extend inwardly from at least one of the walls 12 or the base 14 of the tank 10 to retain rags present in the sewage. In the preferred, illustrated embodiment, there are three rows of projections 24 shown on the base 14 and one row on the wall 12 remote from the auger 18 and the diffuser 16. As shown in FIG. 1, the projections 24 in one row on the base 14 are staggered relative to the projections 24 in the neighbouring row. In the preferred embodiment illustrated, the projections 24 are inclined in relation to the base 14 or walls 12. The inclination is such that the outer end of the projection 24 is upstream of the inner end of the projection 24 so that the flow is into the included angle which, typically, is about 45° to 50°. However, FIG. 4 illustrates that the mounting of the projections 24 may be varied, as required for the best results.

Figure 4:
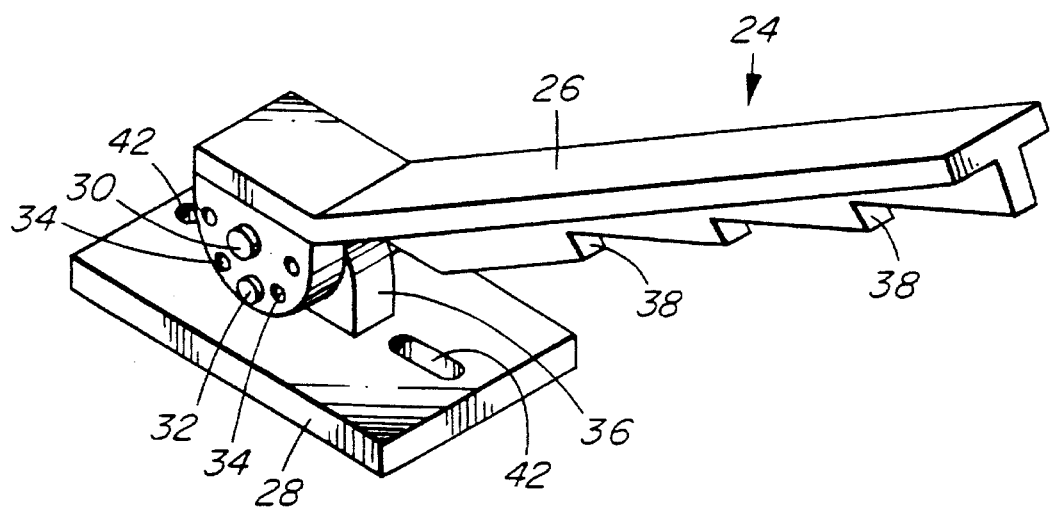
FIG. 4 illustrates a structure that permits variation of the angle of mounting of the projection.

In FIG. 4 this arrangement, the projections 24 are formed in two parts with an upper part 26 pivotally attached to a base 28 and pivotable about an axle 30 but lockable by the insertion of a pin 32 through aligned holes 34 in part 26 that aligns with openings (not shown) in a lug 36 on base 28.

It is desirable to put a plurality of projections, for example three, closely spaced, directly in front of any brackets or bearings that are especially prone to rag accumulation. This is shown in FIGS. 1, 2 and 5.

Desirably there are serrations 38 on the upstream edge of part 26 at each projection 24 as it has been found that this facilitates their ability to gather rags.

Figure 3:
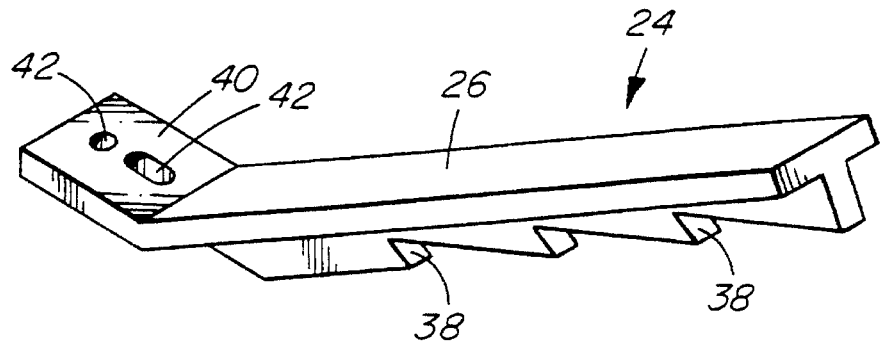
FIG. 3 is an isometric view of a projection useful according to the present invention.

In the embodiment of FIG. 3, each projection 24 includes a foot 40 that allows mounting of the projection 24 on a wall 12 or base 14 of the tank 10. This is because, at least at the present time, the projections 24 will be added to an existing tank 10. However, it should be pointed out that these tanks are made of concrete and it may be desirable to mould the projections into the base 14 or wall 12 of the tank 10. In the illustrated embodiment, the foot 40 is provided with two openings 42 through which bolts may be forced into the concrete of the tank 10. As shown, one opening 42 may be elongated to facilitate bolt installation.

FIG. 5 is a plan view showing a typical arrangement of projections 24 within a tank 10 having an auger 18 mounted in bearings carried by brackets 44 on the wall 12. The projections 24 on the wall 12 are at separation 'a'. There are three rows of projections on the base 14. In the first two rows the projections 24 are at separation 'b'. The projections 24 in the third row, adjacent the auger 18, are at separations 'c'. This third row is a distance 'd' from the center line of the auger 18 and the rows on the base 14 are, as shown in FIG. 5, at distances 'e' and 'f' from the center line of the auger 18.

Projections 24 on the wall 12 are at a height 'g' above base 14 as shown in FIG. 2.

It is in no way critical, but, typically, 'a' will be about 2 feet, 'b' about 30 inches, 'c' about 6 inches, 'd' about 4 feet, 'e' about 7 feet, 'f' about 9 feet and 'g' about 2 feet. The significance of the row of projections 24 at a distance 'd' from the auger 18 is that they are closely spaced, and arranged to protect the bearings and the bearing brackets 44.

The present invention has provided an effective and economical method of removing rags from sewage. The projections 24 do not need maintenance, have no components that move during operation, do not need power, are economical to produce and easy to install. Furthermore, it is easy to remove rags from them, typically with a hook.

The projections may be made of steel bar, aluminum or plastic. Stainless steel is preferred. In tests conducted over three and a half months, excellent results were observed. About 800 pounds of rags were removed from a small tank and about 1200 pounds from a large tank. The angle of the projections 24 not only facilitates the collection of rags but also the removal of those rags when the tank 10 is drained. Generally it is only necessary to use a hook to pull the rags from the projections 24. It is not necessary to use a sharp knife to cut the rags.

No corrosion was observed during the period of the test. This in spite of the fact that no treatment or anti-rust application was carried out prior to installation.

About 40 to 58 projections 24 according to the present invention may be installed in each tank 10, depending on tank size.

Typically the parts 26 of the projections 24 will be about 24" in length and the foot 40 about 5" in length. These are not critical dimensions, but projections 24 of similar dimensions were used in the test and have proved effective. Although rag accumulation on the projections 24 is excellent there is no interference with normal liquid flow.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. In an aerated grit removal tank for the treatment of sewage, the tank having walls and a base and including a screw conveyor for removal of grit and an aerator pipe forming means to allow circulation of the sewage by the passage of air, the improvement comprising a plurality of projections extending inwardly from at least one of said walls or said base of said tank forming means to trap rags present in the sewage.

2. A tank as claimed in claim 1 in which the projections are mounted in a plurality of rows.

3. A tank as claimed in claim 2 in which the projections in one row are staggered relative to the projections in a neighbouring row.

4. A tank as claimed in claim 1 in which the projections are on the wall and on the base.

5. A tank as claimed in claim 1 in which the projections are inclined in relation to said base or said wall.

6. A tank as claimed in claim 5 in which the projections are inclined so that an outer end of a projection is upstream of an inner end of the projection relative to circulation flow in the tank.

7. A tank as claimed in claim 6 in which the included angle of the projection is about 40° to 60°.

8. A tank as claimed in claim 7 including mounting means for the projection that allows variation of said included angle.

9. A tank as claimed in claim 6 including serrations on an upstream edge of the projection.

10. A tank as claimed in claim 1 in which each projection includes a foot to allow mounting of the projections on a wall or base of the tank.

* * * * *